United States Patent [19]

Shores

[11] 3,742,504
[45] June 26, 1973

[54] AIRCRAFT COLLISION AVOIDANCE SYSTEM BY PASSING MEANS

[75] Inventor: Marvin W. Shores, Pomona, Calif.

[73] Assignee: General Dynamics Corporation, Pomona, Calif.

[22] Filed: June 21, 1971

[21] Appl. No.: 154,969

[52] U.S. Cl. .................. 343/112 CA, 343/100 PE
[51] Int. Cl. ............................................. G01s 3/02
[58] Field of Search ............... 343/112 CA, 100 PE

[56] References Cited
UNITED STATES PATENTS
3,680,111  7/1972  Killion et al. ............... 343/100 PE Primary Examiner—Benjamin A. Borchelt
Assistant Examiner—A. M. Psitos
Attorney—Edward B. Johnson et al.

[57] ABSTRACT

A passive collision avoidance system, having particular applicability to aircraft collision avoidance, comprising two receivers operating out of antennas which have a differing sensitivity to the polarization of the incoming signals from a ground broadcast facility. The differing sensitivity ensures that the direct and reflected signals will predominate in different receivers and therefore when the outputs of the receivers are combined the resultant fade rate will give an indication of the movement of the intruding aircraft with respect to the equipped aircraft. Interpretation of the fade rate allows the equipped aircraft to change course until a non-collision course is attained.

4 Claims, 3 Drawing Figures

Patented June 26, 1973 3,742,504

INVENTOR.
MARVIN W. SHORES
BY Brown & Martin
ATTORNEYS

AIRCRAFT COLLISION AVOIDANCE SYSTEM BY PASSING MEANS

BACKGROUND OF THE INVENTION

Collision avoidance systems to prevent collisions between aircraft, supplementing the protection provided by ground based air traffic control operations and visual sighting, have been the subject of intensive research in recent years. The increased interest in collision avoidance, is in part the result of the increase in numbers and utilization of aircraft, especially around crowded terminals near large metropolitan areas. Aircraft accident statistics show that most mid-air collisions occur in proximity to a busy airport terminal, whether it be a general aviation facility or a large commercial operation.

The systems thus far proposed for collision avoidance have required a cooperative relationship between the equipped aircraft for an effective avoidance signal to be produced. The cooperative relationship may take the form of some kind of emitting source on all aircraft, which can be detected by sensors on equipped aircraft to provide a proximity or collision course indication with respect to intruding aircraft and in some cases to provide an indication of what avoidance action should be initiated by the pilot.

Radar systems have been proposed to protect an aircraft from collision, but these have proved to be impractical in the absence of a reply transponder beacon upon the intruding aircraft.

The simplest kind of cooperative system thus far proposed involves the use of a sensor which detects the radiation from aircraft light strobes. In addition to their requirement that all intruding aircraft having equipment to produce a light strobe of the proper intensity and frequency, these systems require 360° coverage by both the radiating aircraft and the receiving aircraft, necessitating multiple strobes and multiple strobe sensors.

The cooperative system which has been frequently proposed for use in airline operations is based on a common time base which must be continually updated, for example, from a ground source to be sure that all aircraft are operating on precisely the same time reference. This system would be extremely expensive to implement and would be practical only for expensive commercial aircraft.

Thus there is no satisfactory collision avoidance system for general aviation aircraft, that will produce a reliable indication of impending collision, while satisfying the low cost, light weight requirements of this type of aircraft.

SUMMARY OF THE INVENTION

An exemplary embodiment of the invention is based on the recognition that the maximum need for collision avoidance protection, coincides with the proximity of the aircraft to a major metropolitan area and this proximity virtually ensures than an FM broadcast station or other suitable continuously operating station will be operating in the area. Therefore, the invention seeks to utilize existing broadcast signals in collision avoidance.

The basic phenomena utilized, in the device of the invention, is similar to that experienced in the viewing of a televised program where a cyclical variation in signal strength is produced by a variation in the phase relationship between the signal received direct from the station and that reflected from an over-flying aircraft. This phenomena is produced by the fact that two relatively strong signals are being received together and therefore beat against one another, and those two relatively strong signals have different path lengths. The variation in the cyclical rate is caused by the change in the path length and if the cyclical variations are coordinated with actual observation of the aircraft, the relative position of subsequent aircraft can be determined, merely by observation of the television picture.

The receivers utilized in the exemplary embodiment of the invention are designed to ensure that at least one broadcast signal is within their band-pass, and for this purpose it is particularly advantageous in the low-cost, light-weight, environment envisioned, to incorporate a bandpass which is as broad as a substantial portion of the FM broadcast band. In this manner the reception of any broadcast FM station operating in the vicinity is ensured without elaborate tuning devices. However, it is within the scope of the invention to operate the system with receivers having automatic or hand tunable devices for selecting a particular broadcasting station.

The receivers operate out of separate antennas and in the instant embodiment, simple dipoles, that are oriented at an angle to one another, and therefore have a different sensitivity to polarized signals, are particuarly advantageous. However, it may be desirable in some installations to use antennas of a different physical character or to electrically simuate the polarization sensitivity.

The outputs of the two receivers are combined to produce a voltage which is an analogue of the phase relationship between the signals received in the first and second channels. That is, if the voltage is constant, a constant phase relationship exists, whereas, if the voltage is varying at a fixed frequency, a fixed rate of change of phase relationship is indicated and finally if the frequency of the voltage is variable, a variable rate of change of phase relationship is indicated. Thus the combined ouput of the two channels indicates the phase relationship between the two incoming signals, and this phase relationship may be displayed to the pilot in a simple manner, by utilizing, for example an aural device which responds to the voltage output of the receivers by producing an aural indication. During the presence of two signals producing a fixed voltage, no tone would be produced. When two signals are producing a fixed frequency output, a steady tone would be produced and a varying tone would be produced when the two signals are producing a variable frequency voltage. Similarly, an indicator may be used separately or in combination with the aural indicator that produces a flashing light which responds to the ouput voltage in the same manner as the aural signal. The light would produce a constant illumination during the presence of a fixed voltage. More complex output devices, utilizing automatic phase lock and velocity gate techniques, could be driven by the voltage output of the two receivers, to provide more detailed information on the intruders course, but the simple indicator is presently preferred in view of the cost and weight limitation previously discussed.

The particular advantage in selecting the FM band for use with the system, in addition to the availability of stations, is that it has a wavelength of approximately 10 feet for the center frequency that results in an output voltage having a frequency in the audio range for the maximum relative velocities that would be experienced, and makes the use of simplified audio and/or visual annunciators possible. Another advantageous characteristic is the relatively low modulation frequency in comparison with the operating frequency in the 88 to 108 megahertz band. Because of this relationship, the phase shift induced in the long wavelength modulation portion of the signal, may be ignored and the normal expression for a frequency modulated signal, $e = E \cos(w_c t + \Delta w/\rho \sin \rho t)$, may be simplified to $e = E \cos w_c t$, the expression for an unmodulated carrier. The expression for the reflected signal then would be $e = E \cos(w_c + \theta)t$ with $\theta$ representing the path length difference. If the path length is varying then the value of $2\pi f c + \theta$ will vary from minus one through zero to plus one. If the receivers are configured to vary their gain to produce a constant output, the voltage variation with phase shift of the combined output will be a maximum. The ouput is represented by the formula $k_d e_d + k_r e_r$ with the sub-designation $d$ and $e$ referring to the direct and reflected signals. The output will vary from $k_d e_d - k_r e_r$ to $k_d e_d + k_r e_r$ where $k$ is the gain of the receiver. It is this sum and difference signal that is that produced by the voltage of varying frequency utilized in the manner previously described.

Thus there is produced a system that makes maximum use of existing facilities and natural phenomena to reduce the cost complexity and weight in an effective collision avoidance system.

It is therefore an odject of the invention to provide a new and improved aircraft collision avoidance system.

It is another object of this invention to provide a new and improved aircraft collision avoidance system which does not rely on the intruding aircraft having cooperative equipment.

It is another object of this invention to provide a new and improved aircraft collision avoidance system which is low in cost.

It is another object of this invention to provide a new and improved aircraft collision avoidance system which is light in weight.

It is another object of this invention to provide a new and improved aircraft collision avoidance system that uses a simple means of indicating the presence of an intruder on a collision course.

It is another object of this invention to provide a new and improved aircraft collision avoidance system that provides a simple means of indicating the systems ability to operate.

It is another object of this invention to provide a new and improved collision avoidance system that is effective in the areas of highest aircraft density.

It is another object of this invention to provide a new and improved aircraft collision avoidance system that utilizes relatively few components.

It is another object of this invention to provide a new and improved aircraft collision avoidance system which is easy to install.

Other objects and many advantages of this invention will become more apparent upon a reading of the following detailed description and an examination of the drawings wherein like reference numerals designate like parts throughout and in which.

Figure 1:
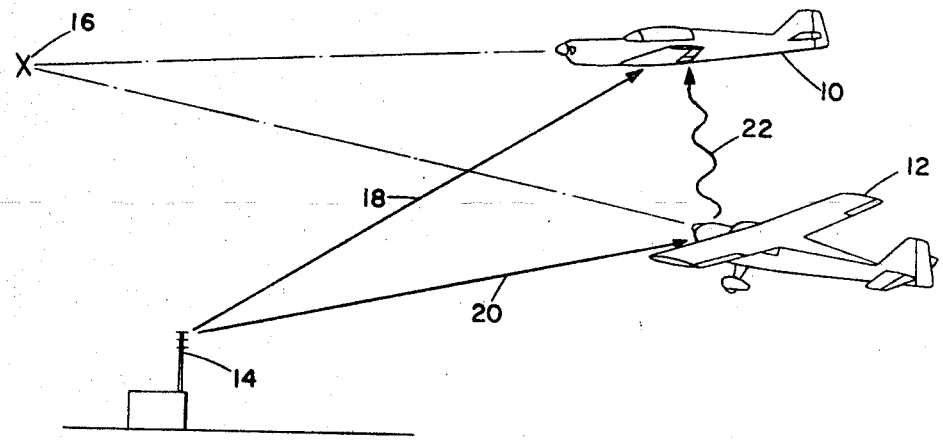
FIG. 1 is a persepctive view showing an intruder aircraft and an equipped aircraft utilizing the system of the invention.

Referring now to the figures, FIG. 1 illustrates an equipped aircraft 10 and intruder aircraft 12 flying within range of the signals from a broadcast station 14. The paths of the ircraft are illustrated as being converging, with both aircrafts passing through a point 6. Therefore a potential collision situation exists between the illustrated aircraft that will be avoided only if the speeds of the aircraft are such that they will pass point 16 at different times or if one or both of the aircraft take evasive action.

The radiated signal from the FM stage 14 is illustrated as reaching the equipped aircraft through two paths. The first path is the direct path 18 and the second path is the reflected path which includes a direct portion 20 to the intruder craft and a reflected signal 22 to the equipped aircraft.

Figure 2:
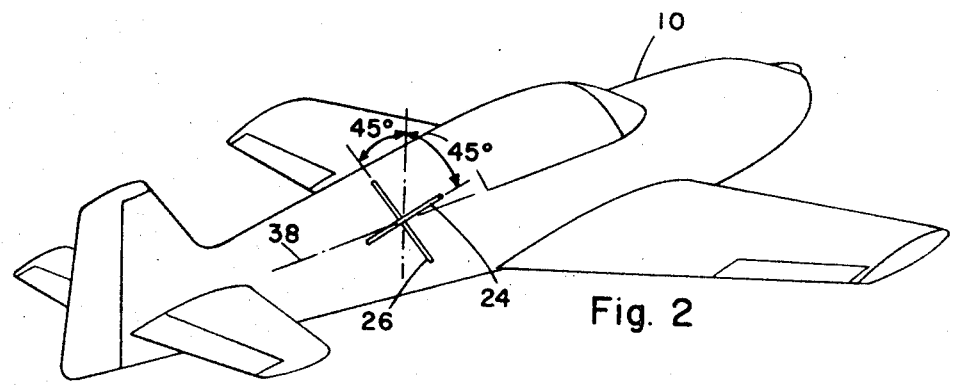
FIG. 2 is a diagrammatic view of an aircraft showing the antenna installation of the invention.

The equipped aircraft is schematically illustrated in FIG. 2 which illustrates the orientation of the dipole antennas about the vertical axis of the aircraft. This vertical axis corresponds to the actual vertical when the aircraft is in level flight. The dipoles 24 and 26 are physically crossed about a center which corresponds to the center line 38 of the aircraft. The plane that includes both dipole antennas is therefore perpendicular to the center line of the aircraft. It should be noted that the dipoles need not be crossed at the center line of the aircraft, but may be crossed at any parallel thereto. Thus it will be apparent that the antennas may comprise a plurality of sets of polarization sensitive antennas located, for example, above and below the aircraft fuselage or on either wing tip.

Figure 3:
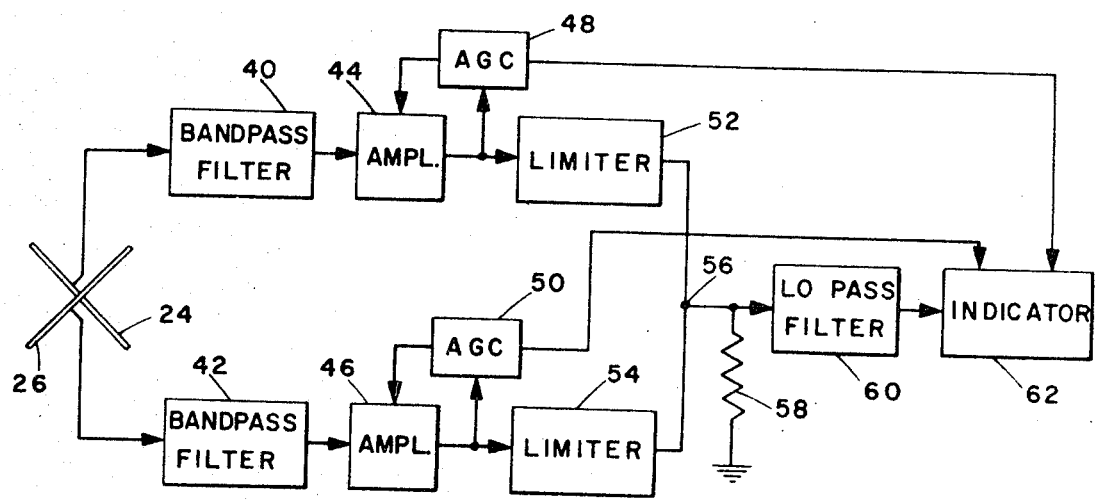
FIG. 3 is a schematic representation of the system of the invention.

Referring now to FIG. 3, there is illustrated a schematic representation of the invention. The antennas 24 and 26 are shown connected to identical receivers 40 and 42 respectively. Each receiver's output is amplified by corresponding amplifiers 44 and 46. These amplifiers are controlled by automatic gain controls (AGC) 48 and 50 in order to obtain as nearly as possible a level output. The equality of the output from the receivers is further perfected by limiting circuits 52 and 54 that cut off all amplitudes above a certain value, and are adjusted to cut off a value below that for the AGC controlled output. The outputs of the two receivers are combined at point 56, and the output voltage is developed across a resistive load 58. A low pass filter 60 is utilized to pass only the beat or fade frequency developed between the two signals, which beat frequency is passed to the indicator 62 that may be, for example, a horn or other aural annunciator that produces a tone at the input frequency, of sufficient volume to alert the aircraft operator. The indicator also provides for the display of the condition of each automatic gain control. This indication would normally take the form of a light that would be illuminated when sufficient signal was present to obtain AGC level.

In operation, the polarization sensitive antennas operated in a field that includes signals traveling a direct path from the broadcast facility and those traveling an indirect path by reflection. The signals which arrive by direct radiation have a definite polarization as a result of the polarization of the broadcast antenna. The off vertical orientation of the receiving antennas and therefore the orientation of their axes of maximum polarization sensitivity is such that normally the broadcast signal will predominate at the output of one antenna or the other. For purposes of illustration, it is assumed that the broadcast signal predominates in antenna 24. The second signal, under consideration, is the signal traveling by the reflected path from the broadcast facility and the intruder aircraft. Because of the complex surfaces of the aircraft, and the characteristics of reflected waves generally, the reflected signal will be randomly oriented as to polarization. Thus the reflected signal will be received substantially equally in each channel. However, since both signals are amplified to the same level, the effect is that the reflected signal will predominate in the output of the channel utilizing antenna 26.

The range of sensitivity of the receivers is controlled, through the use of, for example, bandpass filters as are illustrated at 40 and 42. In the specific embodiment of the invention, these bandpass filters are fixed but are broad banded to pass any signal within the frequency band selected, for example, 88 to 108 megahertz. The signal is delivered from the bandpass filters to the amplifiers and increased an amount determined by an automatic gain control configured to produce as nearly constant an output as is practical. The equality of signal strength in both channels is further enhanced by the use of limitors 52 and 54 which are set to cut off at a signal level below that selected for the AGC controlled amplifier output. Thus the signal output of each channel is cut down to the same level and the signals are combined at point 56.

The signals are allowed to develop a varying voltage across load resistor 58. A portion of this voltage variation will be the result of combining the outputs of the two channels which differ primarily in that one channel has a predominance of the direct signal, and the other a predominance of the reflected signal. Thus, if the phase relationship between the direct and reflected signal varies, a beat frequency will be developed that corresponds to the rate at which the phase relationship is varying. Assuming that the two aircraft are flying in formation so that the total path length between the aircraft is constant, the phase relationship will maintain itself at a constant rate, and the difference signal between the two channels will be a DC voltage. If however, the distance between the two aircraft is varied by virtue of the fact that the aircraft are on divering or converging courses, then the total path length will also be varied and the phase relationship between the diect and reflected signals will vary. The variation of this phase relationship will effect a beat frequency producing a varying voltage of that frequency across resistor 58. For the speeds normally encountered in relative velocities between converging aircraft, this voltage variation will create an audio frequency which will be passed by low pass filter 60. The low pass filter operates to exclude the RF signal and all other frequencies not of interest for collision avoidance.

The output of the low pass filter is connected to an indicator 62, and this audio frequency, previously described, is displayed in a manner suitable to the purpose for which the equipment is installed. For example, in a light aircraft where cost is of prime importance, the indicator may comprise either singly or in combination, aural and visual warnings which produce an aural and visual fluctuation corresponding in frequency to the voltage variation resuting from the changing phase relationship. Installations calling for a more complex and informative output may utilize any one of a number of well known types of indicators, including indicators utilizing automatic phase lock or velocity gate techniques, for example.

In normal operation, the aircraft operator would receive an indication that a signal was present in either channel by the illumination of a light on the panel. The panel light indicates that an AGC level is present and therefore a sufficient signal is present within the broadcast band to produce an output for purposes of intruding aircraft detection. When an aircraft enters within range and produces a reflective signal of sufficient strength, both channels will show an AGC level and a best frequency will be developed.

In some situations it may be desirable to display an indication of the presence of another aircraft, even if that aircraft is flying in formation with the equipped aircraft, and in installations using a visual indicator, this could be displayed as a steady light. When the intruding aircraft is on a non-collision converging or diverging course, the voltage output of the two channels beat frequency will vary at a variable frequency that is, the distance relationship between the two aircraft is constantly varying and the angular relationship between those aircraft is varying so that the phase relationship is changing at a variable rate, producing a varying output frequency. On a light or aural indicator this would be displayed as a sound changing in pitch or a flashing light changing in repetition rate. If the intruding aircraft is on a converging collision course, or on a diverging course that produces a constant angular relationship between the aircraft, then the output to the aural or visual annunciator will be fixed in frequency. This phenomena is similar to that utilized in ship naviation to indicate the possibility of collision with another ship. According to this technique, a collision between an intruding ship is iminent when that ship continues in the same regular relationship to the observing ship. That is, if the vessels have a course which crosses one another there will be a collision if the observed ship does change in angular relationship to the travel of the equipped ship from that when initially observed. The situation described in the ship analogy produces the constant tone or a flashing light of constant rate, and alerts the pilot to take evasive action.

Because of the nature of the system it is possible that such evasive action will be indicated despite the fact that the aircraft are on diverging courses, where that diverging course also produces a constant angular relationship, however, this false indication of a potential collision would be relatively infrequent because an intruding aircraft, flying a fixed course, would of necessity first come from outside the sphere of concern of the equipped aircraft, and therefore would have to be on a converging course. In any case, the aircraft operator need only alter course sufficiently to create a variable tone and having thereby been assured that no collision is iminent may redirect his attention to the other operations at hand.

Having described my invention, I now claim.

1. A passive collision avoidance system for aircraft comprising:
   first radio frequency receiver means for receiving a signal from a ground broadcast facility;
   second radio frequency receiver means for receiving a signal from a ground broadcast facility;

first antenna means connected to said first receiver means and having a sensitivity to the polarization of signals;
second antenna means connected to said second receiver means and having a sensitivity to the polarization of signals;
said polarization sensitivity of said first and second antennas being different over a substantial portion of the range of possible polarization orientations;
the axis of maximum polarization sensitivity of said first antenna being displaced by approximately 90° from the axis of maximum polarization sensitivity of said second antenna;
said first and second antennas being mounted in an aircraft and having the long axis of said first and second antennas each displaced 45° from the vertical axis of said aircraft;
said first and second antennas comprising dipole antennas centered about the same point, and arranged in quadriture symmetrically about an axis parallel to the roll axis of said aircraft;
said first and second receivers being sensitive to any signal frequency within substantially all of the FM broadcast band;
an output means for determining the phase relationship between the output of said first and second receivers;
said output means including indicator means for indicating a phase relationship that is changing at a fixed rate.

2. The passive collision avoidance system of claim 1 wherein:
said first and second receivers include means for producing output signals of substantially equal amplitude.

3. The passive collision avoidance system of claim 1 wherein:
said output means includes means for combining said first and second receivers output to produce a beat frequency;
and display means for displaying said beat frequency.

4. The passive collision avoidance system of claim 3 wherein:
said output means comprises an oral indicator means for producing a tone corresponding to said beat frequency and a light indicator means for producing a light flashing at said beat frequency.

* * * * *